United States Patent
An

(10) Patent No.: US 9,751,485 B2
(45) Date of Patent: Sep. 5, 2017

(54) KNEE BOLSTER DEVICE FOR VEHICLE

(71) Applicants: HYUNDAI MOTOR COMPANY, Seoul (KR); KIA MOTORS CORPORATION, Seoul (KR)

(72) Inventor: Jae Hyun An, Seosan-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 14/863,445

(22) Filed: Sep. 23, 2015

(65) Prior Publication Data
US 2016/0129870 A1 May 12, 2016

(30) Foreign Application Priority Data

Nov. 6, 2014 (KR) .................. 10-2014-0153448

(51) Int. Cl.
*B60R 21/045* (2006.01)
*B60R 21/00* (2006.01)

(52) U.S. Cl.
CPC .... *B60R 21/045* (2013.01); *B60R 2021/0051* (2013.01)

(58) Field of Classification Search
CPC .............................. B60R 21/04; B60R 21/045
USPC .................................................. 180/336, 346
See application file for complete search history.

(56) References Cited

U.S. PATENT DOCUMENTS

| | | | | |
|---|---|---|---|---|
| 5,311,960 A * | 5/1994 | Kukainis | ............... | B60R 21/045 180/90 |
| 5,660,426 A * | 8/1997 | Sugimori | ............ | B60R 13/0206 267/140 |
| 6,017,084 A * | 1/2000 | Carroll, III | .......... | B60N 2/4249 280/751 |
| 6,186,546 B1 * | 2/2001 | Uhl | ....................... | B60R 21/045 280/751 |
| 6,199,942 B1 * | 3/2001 | Carroll, III | ............. | B60R 21/04 188/377 |
| 6,679,967 B1 * | 1/2004 | Carroll, III | .......... | B60N 2/4249 156/222 |
| 7,201,434 B1 * | 4/2007 | Michalak | ............... | B60K 37/00 280/752 |
| 7,293,800 B2 * | 11/2007 | Abe | ........................ | B60R 21/04 280/751 |
| 7,311,327 B2 * | 12/2007 | Yamazaki | ............. | B60R 21/045 280/751 |
| 7,360,822 B2 * | 4/2008 | Carroll, III | .......... | B60N 2/4249 188/371 |
| 7,367,587 B2 * | 5/2008 | Taoka | ................... | B60R 21/045 280/728.2 |

(Continued)

FOREIGN PATENT DOCUMENTS

| | | | | |
|---|---|---|---|---|
| GB | 1316722 A | * | 5/1973 | ........... B60R 21/045 |
| GB | 2425097 A | * | 10/2006 | ........... B60R 21/045 |

(Continued)

*Primary Examiner* — Karen Beck
(74) *Attorney, Agent, or Firm* — McDermott Will & Emery LLP

(57) ABSTRACT

A knee bolster device for a vehicle includes a lower crash pad panel having a composite material injection-molded thereto at a rear surface of the lower crash pad panel to improve rigidity of the lower crash pad panel. A shock absorbing foam is mounted on a rear surface of the lower crash pad panel and absorbs an impact.

6 Claims, 4 Drawing Sheets

A-A CROSS SECTION

(56) References Cited

U.S. PATENT DOCUMENTS

| | | | | |
|---|---|---|---|---|
| 7,393,013 B2* | 7/2008 | Best | ............ | B60R 21/045 280/750 |
| 7,416,212 B2* | 8/2008 | Iwasaki | ............ | B60R 21/045 280/751 |
| 7,431,338 B2* | 10/2008 | Hayata | ............ | B60R 21/045 280/752 |
| 7,478,832 B2* | 1/2009 | Kong | ............ | B60R 21/04 280/748 |
| 7,625,036 B2* | 12/2009 | Cormier | ............ | B60R 19/18 293/102 |
| 8,158,539 B2* | 4/2012 | Balthes | ............ | B29C 43/021 442/136 |
| 8,267,428 B2* | 9/2012 | DePue | ............ | B60R 21/02 280/751 |
| 8,333,407 B2* | 12/2012 | An | ............ | B60R 21/045 280/751 |
| 8,465,051 B2* | 6/2013 | Ha | ............ | B60R 21/045 280/751 |
| 8,668,238 B2* | 3/2014 | Kuwano | ............ | B60R 7/06 224/483 |
| 9,248,798 B2* | 2/2016 | Roychoudhury | ..... | B60R 21/045 |
| 9,399,435 B2* | 7/2016 | Preisler | ............ | B32B 7/12 |
| 9,457,755 B2* | 10/2016 | Merkel | ............ | B60R 21/045 |
| 2003/0057760 A1* | 3/2003 | Horsch | ............ | B60R 21/045 297/423.41 |
| 2004/0100081 A1* | 5/2004 | Laborie | ............ | B60R 21/045 280/752 |
| 2005/0052011 A1* | 3/2005 | Best | ............ | B60R 21/045 280/752 |
| 2005/0156421 A1* | 7/2005 | Nykiel | ............ | B60R 21/045 280/752 |
| 2005/0200110 A1* | 9/2005 | Zierle | ............ | B60R 21/045 280/752 |
| 2006/0038390 A1* | 2/2006 | Cho | ............ | B60R 21/045 280/752 |
| 2007/0164548 A1* | 7/2007 | Abe | ............ | B60R 21/04 280/752 |
| 2008/0012279 A1 | 1/2008 | Ellison et al. | | |
| 2009/0322063 A1* | 12/2009 | Adachi | ............ | B60R 21/203 280/730.1 |
| 2010/0084884 A1* | 4/2010 | Taracko | ............ | B60R 7/06 296/37.12 |
| 2016/0129870 A1* | 5/2016 | An | ............ | B60R 21/045 280/752 |

FOREIGN PATENT DOCUMENTS

| | | |
|---|---|---|
| JP | 2003-312419 A | 11/2003 |
| JP | 2012-523334 A | 10/2012 |
| KR | 2001-0004479 A | 1/2001 |
| KR | 10-2005-0090813 A | 9/2005 |
| KR | 10-2006-0070087 A | 6/2006 |
| KR | 10-2012-0029714 A | 3/2012 |
| KR | 10-2014-0064087 A | 5/2014 |
| WO | WO 2015045492 A1 * | 4/2015 ........... B60R 21/045 |

* cited by examiner

A-A CROSS SECTION

-- RELATED ART -- ary embodiments thereof illustrated in the accompanying drawings which are given hereinbelow by way of illustration only, and thus are not limitative of the present invention.
KNEE BOLSTER DEVICE FOR VEHICLE

CROSS-REFERENCE TO RELATED APPLICATION

This application claims under 35 U.S.C. §119(a) the benefit of priority to Korean Patent Application No. 10-2014-0153448 filed on Nov. 6, 2014, the entire content of which is incorporated herein by reference.

TECHNICAL FIELD

The present disclosure relates to a knee bolster device for a vehicle. More particularly, the present disclosure relates to a knee bolster device for a vehicle, which is capable of satisfying enforced regulations for passenger safety at a vehicle collision test, and minimizing manufacturing costs and the number of work processes.

BACKGROUND

During a vehicle collision, an occupant in a vehicle may move toward a crash pad in front of the occupant by inertia, and thus, airbags and seat belts are provided in the vehicle to protect the occupant, for example, an abdominal region of the occupant. However, when an engine compartment is crushed inward, a cowl cross bar, which is mounted inside the crash pad at a lower side thereof, and a lower panel including a lower portion of the crash pad may strike a knee of the occupant.

To address the above concern, a knee bolster is mounted inside the crash pad (dash board) at the lower side thereof in order to reduce severity of injury to the knee.

Referring to FIG. 5, a knee bolster in the related art includes: a knee bolster panel 4 which couples a shock absorbing foam 3 to a U-shaped bracket 2 mounted to one side of a cowl cross bar 1. The knee bolster panel 4 is fastened to the front of the knee bolster and made of steel or glass fiber reinforced thermoplastic (GMT). A lower crash pad panel 5 covers the knee bolster panel 4 for the purpose of an aesthetic appearance and is made of a polymer material. According to the knee bolster, when a knee of an occupant hits the lower crash pad panel 5 during a vehicle collision, the knee bolster panel 4, which is a rigid body, prevents the knee from crashing further toward the inside of the knee bolster panel 4. The shock absorbing foam 3, which is mounted to the rear of the knee bolster, absorbs impact energy while deforming together with the U-shaped bracket 2.

However, the structure of the knee bolster according to the related art is complicated, and thus increases the number of assembly hardware and components and cost.

The above information disclosed in this Background section is only for enhancement of understanding the background of the invention, and therefore, it may contain information that does not form the prior art that is already known in this country to a person of ordinary skill in the art.

SUMMARY OF THE DISCLOSURE

The present disclosure has been made in an effort to solve the above-described problems associated with prior art and to provide a knee bolster device for a vehicle, in which a continuous fiber thermoplastic (CFT), which has continuity of woven and stacked structures, is inserted into a lower crash pad panel disposed inside the vehicle to improve rigidity. A shock absorbing foam is fixed by a pocket formed on a rear surface of the lower crash pad panel, thereby preventing a knee of an occupant from further crashing toward an inside of the lower crash pad panel and reducing impact applied to the knee at the time of a vehicle collision.

According to an exemplary embodiment of the present inventive concept, a knee bolster device comprises a lower crash pad panel, in which the lower crash pad panel having a composite material injection-molded thereto at a rear surface of the lower crash pad panel to improve rigidity of the lower crash pad panel. A shock absorbing foam is mounted on a rear surface of the lower crash pad panel and absorbs an impact The lower crash pad panel may include a pocket, on which the shock absorbing foam is mounted, protruding on the rear surface of the lower crash pad panel.

The shock absorbing foam may be mounted at one of a left side and a right side of the lower crash pad panel, or the shock absorbing foam may be mounted at both of the left and right sides of the lower crash pad panel.

The composite material may be a continuous fiber thermoplastic inserted into the lower crash pad panel to improve the rigidity of the lower crash pad panel.

The knee bolster device may further includes a cowl cross bar installed inside the lower crash pad panel in a width direction of the vehicle. A rear supporting bracket may be formed at one side of the cowl cross bar to be spaced apart from a rear side of the shock absorbing foam. The rear supporting bracket may absorb the impact while deforming together with the shock absorbing foam.

The knee bolster device for a vehicle according to the present disclosure prevents a knee of an occupant from additionally entering an inside of the lower crash pad panel and reduces an impact applied to the knee when the knee hits the lower crash pad panel during a vehicle collision, thereby satisfying enforced regulations for passenger safety at the time of conducting a vehicle collision test.

The knee bolster device for a vehicle according to the present disclosure reduces manufacturing cost and weight, and reduces the number of assembly processes by reducing the number of components.

Other aspects and exemplary embodiments of the inventive concept are discussed infra.

It is understood that the term "vehicle" or "vehicular" or other similar terms as used herein is inclusive of motor vehicles in general such as passenger automobiles including sports utility vehicles SUV, buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles e.g., fuel derived from resources other than petroleum. As referred to herein, a hybrid vehicle is a vehicle that has two or more sources of power, for example both gasoline-powered and electric-powered vehicles.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present invention.

Figure 1A:
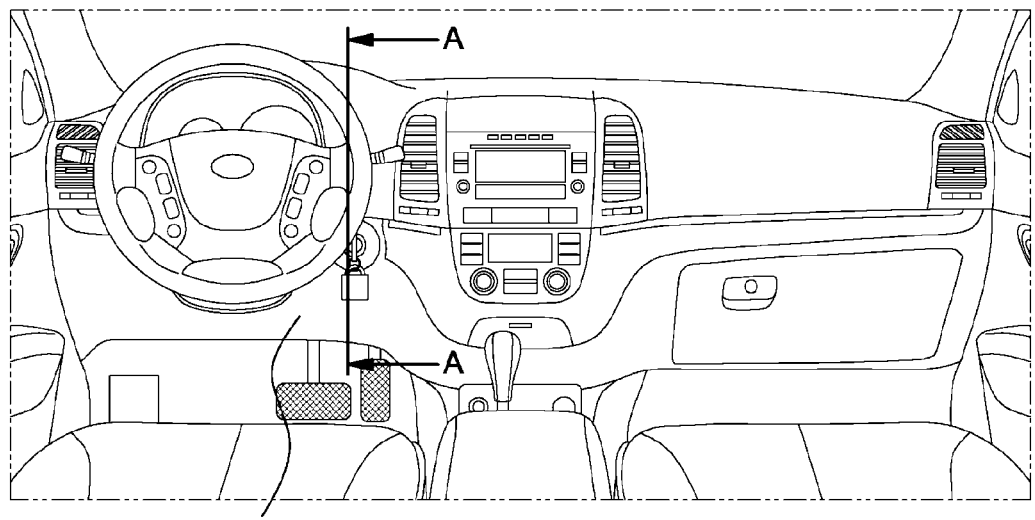
FIG. 1A is a view illustrating an interior of a vehicle having a knee bolster device according to an exemplary embodiment of the present inventive concept.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter, reference will now be made in detail to various embodiments of the present inventive concept, examples of which are illustrated in the accompanying drawings and described below. While the disclosure will be described in conjunction with exemplary embodiments, it will be understood that the present description is not intended to limit the disclosure to those exemplary embodiments. On the contrary, the disclosure is intended to cover not only the exemplary embodiments, but also various alternatives, modifications, equivalents, and other embodiments, which may be included within the spirit and scope of the disclosure as defined by the appended claims.

Hereinafter, an exemplary embodiment of the present inventive concept will be described with reference to the accompanying drawings so that those skilled in the technical field to which the present disclosure pertains may easily carry out the exemplary embodiment.

The present disclosure relates to a knee bolster device for a vehicle which uses a composite material. The knee bolster device of the present disclosure prevents a knee of an occupant, which hits a lower crash pad panel, from additionally crashing toward an inside of the lower crash pad panel, and reduces impact applied to the knee at the time of a vehicle collision.

Figure 1B:
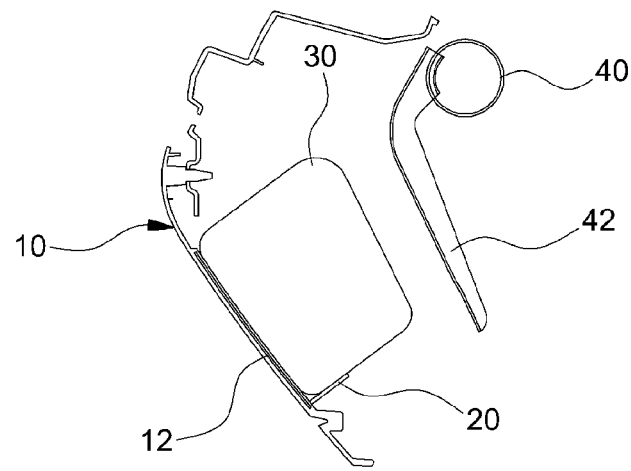
FIG. 1B is a cross-sectional view of the line A-A taken in FIG. 1A according to an exemplary embodiment of the present inventive concept.

Referring to FIGS. 1A and 1B, a lower crash pad panel 10 is disposed at a front lower side of a driver seat inside the vehicle.

In order to inhibit a knee of an occupant from entering inside the lower crash pad panel 10 when the knee hits the lower crash pad panel 10 during a vehicle collision, the lower crash pad panel 10 is includes a composite material 12 by injection-molding. As the composite material 12, which is a continuous fiber thermoplastic (CFT), which increases rigidity of the lower crash pad panel 10, is used.

Figure 2:
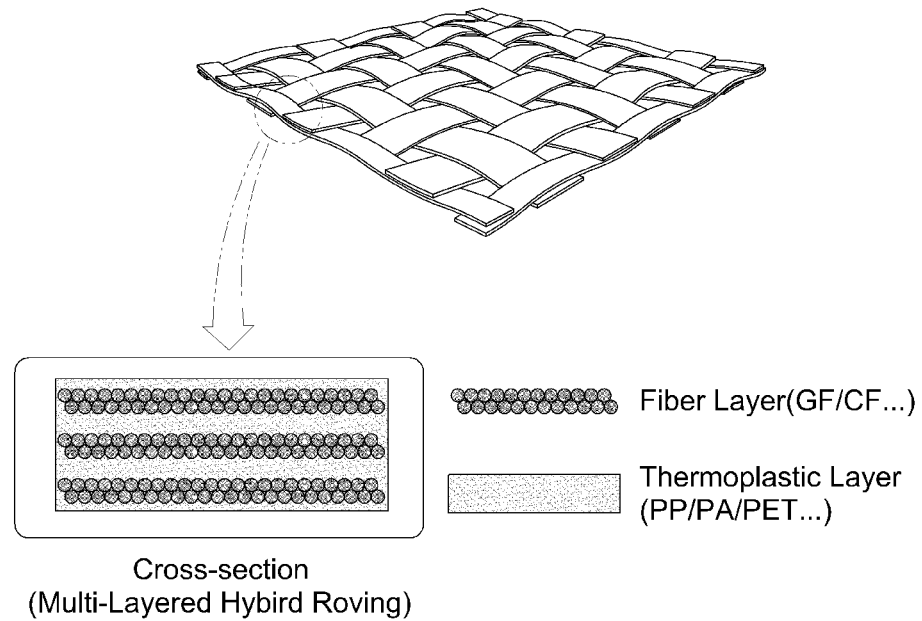
FIG. 2 is a view for explaining a continuous fiber thermoplastic inserted into a lower crash pad panel in an exemplary embodiment of the present inventive concept.
Figure 3:
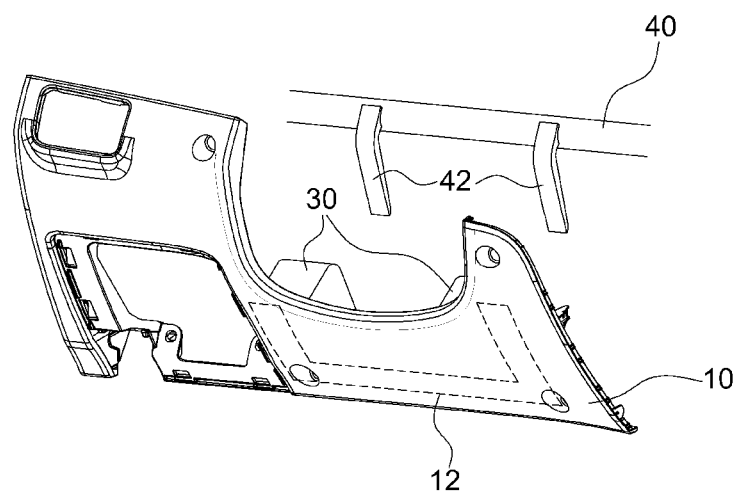
FIG. 3 is a view illustrating a front view of a knee bolster device for a vehicle according to an exemplary embodiment of the present inventive concept.
Figure 4A:
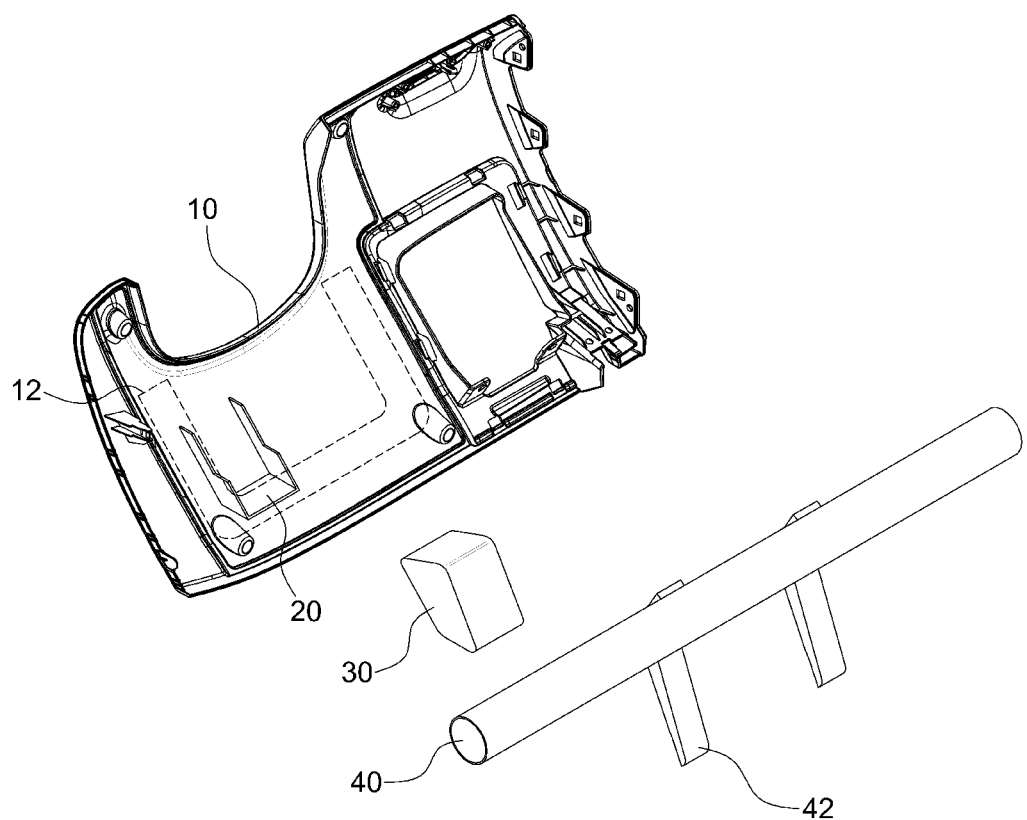
FIG. 4A is a configuration view illustrating the knee bolster device for a vehicle according to the exemplary embodiment of the present inventive concept.
Figure 4B:
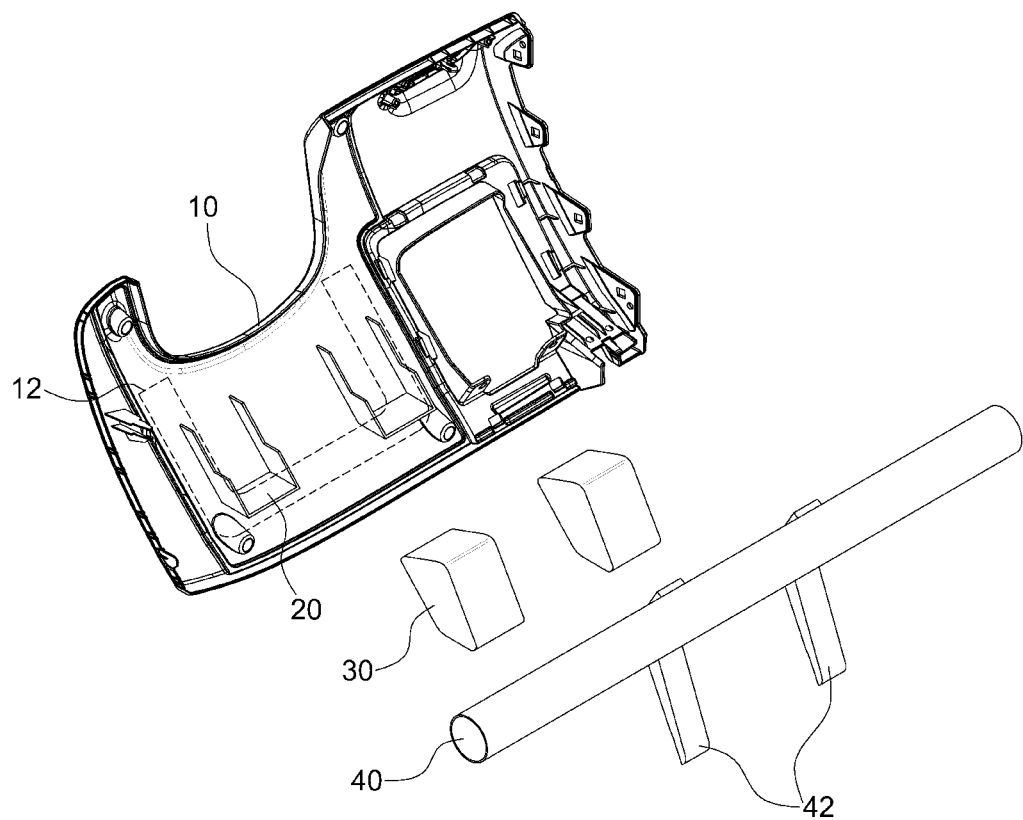
FIG. 4B is a configuration view illustrating a knee bolster device for a vehicle according to another exemplary embodiment of the present inventive concept.
Figure 5:
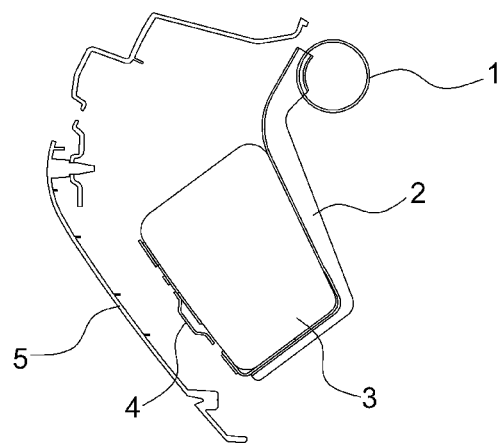
FIG. 5 is a view illustrating a knee bolster device for a vehicle in the related art.

Referring to FIG. 2, the CFT is a composite material made of continuous fibers and a thermoplastic material. That is, the CFT is a composite material produced by weaving the continuous fiber (long filament) and the thermoplastic material in a net shape to form woven fabric, and then staking the woven fabric in a multilayered shape. The CFT is inserted into the lower crash pad panel 10, thereby improving the rigidity of the lower crash pad panel 10.

A glass fiber (GF), a carbon fiber (CF), and the like are used as the continuous fiber, and polypropylene (PP), polyamide (PA), polyethylene terephthalate (PET), and the like are used as the thermoplastic material.

Here, the CFT is inserted into the lower crash pad panel 10 partially, or inserted into the lower crash pad panel 10 entirely, and may be appropriately used in accordance with rigidity design of the lower crash pad panel 10.

Referring to FIGS. 1B, and 3 to 4B, the lower crash pad panel 10, which is made of a polymer material such as polypropylene mineral filled (PPF), has a pocket 20 protruding from a rear surface of the lower crash pad panel 10 so as to fix a shock absorbing foam 30.

The pocket 20 fixes the shock absorbing foam 30 when the shock absorbing foam 30 is seated on the pocket 20, and the pocket 20 may be simultaneously formed when the lower crash pad panel 10 is formed.

The pocket 20 is formed at one of left and right sides of the lower crash pad panel 10 (see FIG. 4A), or the pocket 20 is formed at both of the left and right sides of the lower crash pad panel 10, respectively (see FIG. 4B), and the shock absorbing foam 30 is fixedly coupled and mounted to the pocket 20.

In other words, the shock absorbing foam 30 is mounted at either the left or right side of the lower crash pad panel 10 or both of the left and right sides of the lower crash pad panel 10. The shock absorbing foam 30 may mounted at the left and right sides of the lower crash pad panel 10.

The shock absorbing foam 30 may be made of polyethylene (PE) that absorbs impact when the shock absorbing foam 30 deforms. The shock absorbing foam 30 is fixed to the rear surface of the lower crash pad panel 10, and absorbs the impact energy applied to the knee of the occupant, which collides with the lower crash pad panel 10, while deforming at the time of the vehicle collision.

Further, a cowl cross bar 40 is installed inside the lower crash pad panel 10 in a vehicle width direction, and rear supporting brackets 42 are mounted to one side of the cowl cross bar 40 to be directed toward the lower crash pad panel 10 and the shock absorbing foam 30. The rear supporting brackets 42 are spaced apart a predetermined interval at the rear of the shock absorbing foam 30. The rear supporting brackets 42 are made of steel, and absorb the impact energy applied to the knee of the occupant while deforming together with the shock absorbing foam 30 at the time of a vehicle collision.

According to the knee bolster device of the present disclosure, when the knee of the occupant hits the lower crash pad panel 10, the lower crash pad panel 10 having an improved rigidity prevents the knee from additionally crashing toward the inside of the lower crash pad panel 10 without using an existing knee bolster panel. Further, the shock absorbing foam 30 mounted on the rear surface of the lower crash pad panel 10 absorbs the impact energy caused while deforming together with the rear supporting bracket 42.

The disclosure has been described in detail with reference to exemplary embodiments thereof. However, it will be appreciated by those skilled in the art that changes may be made in these embodiments without departing from the principles and spirit of the disclosure, the scope of which is defined in the appended claims and their equivalents.

What is claimed is:

1. A knee bolster device for a vehicle, comprising: a lower crash pad panel made up of an injection-molded composite material having a continuous fiber and a thermoplastic material woven in a net shape to form woven fabric and so that the woven fabric is stacked in a multi-layered shape thereto at a rear surface of the lower crash pad panel to improve rigidity of the lower crash pad panel, wherein the rear surface of the lower crash pad panel faces a forward direction of the vehicle;

a shock absorbing foam mounted on the rear surface of the lower crash pad panel, the shock absorbing foam being configured to absorb an impact; and a rear supporting bracket formed at one side of a cowl cross bar to be spaced apart from a rear side of the shock absorbing foam, the rear side facing the forward direction of the vehicle at a predetermined interval and the rear supporting bracket having one end opened, wherein the rear supporting bracket is configured to absorb the impact while deforming together with the shock absorbing foam.

2. The knee bolster device of claim 1, wherein the lower crash pad panel includes a pocket, on which the shock absorbing foam is mounted, protruding on the rear surface of the lower crash pad panel.

3. The knee bolster device of claim 2, wherein the shock absorbing foam is mounted at one of a left side and a right side of the lower crash pad panel.

4. The knee bolster device of claim 1, wherein the composite material is inserted into the lower crash pad panel to improve the rigidity of the lower crash pad panel.

5. The knee bolster device of claim 1, further comprising: the cowl cross bar installed inside the lower crash pad panel in a width direction of the vehicle.

6. The knee bolster device of claim 2, wherein the shock absorbing foam is mounted at both of a left side and a right side of the lower crash pad panel.

* * * * *